(12) United States Patent
Abdulkhair et al.

(10) Patent No.: US 12,421,129 B1
(45) Date of Patent: Sep. 23, 2025

(54) COPPER HYDROXY NITRATE/CALCIUM SILICATE @GRAPHITE-PHASE CARBON NITRIDE ($Cu_2(OH)_3NO_3/CaSiO_3@G-C_3N_4$) BASED PHOTOCATALYST FOR WASTEWATER TREATMENT

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/210,805

(22) Filed: May 16, 2025

(51) Int. Cl.
*C01G 3/08* (2006.01)
*B82Y 30/00* (2011.01)

(52) U.S. Cl.
CPC ............... *C01G 3/08* (2013.01); *B82Y 30/00* (2013.01); *C01P 2002/01* (2013.01); *C01P 2002/72* (2013.01); *C01P 2002/84* (2013.01); *C01P 2004/04* (2013.01); *C01P 2004/16* (2013.01); *C01P 2004/45* (2013.01); *C01P 2006/12* (2013.01); *C01P 2006/14* (2013.01); *C01P 2006/16* (2013.01); *C01P 2006/40* (2013.01)

(58) Field of Classification Search
CPC .................................. C01G 3/08; B82Y 30/00
See application file for complete search history.

(56) References Cited

U.S. PATENT DOCUMENTS

2018/0305231 A1   10/2018   Kadi et al.

FOREIGN PATENT DOCUMENTS

| CN | 109289897 A | 2/2019 |
| CN | 111203262 B | 3/2023 |
| CN | 115888792 B | 12/2024 |

OTHER PUBLICATIONS

Muhammad Asim Khan, et al., "Recent advances over the doped g-C3N4 in photocatalysis: A review", Coordination Chemistry Reviews, vol. 522, Sep. 19, 2024, 216227, Excerpts only, 7 pages.

*Primary Examiner* — James A Fiorito
(74) *Attorney, Agent, or Firm* — Oblon, McClelland, Maier & Neustadt, L.L.P.

(57) ABSTRACT

A method of photocatalytic degradation includes contacting a copper hydroxide nitrate/calcium silicate/graphite-phase carbon nitride ($Cu_2(OH)_3NO_3/CaSiO_3@g-C_3N_4$) nanocomposite with a solution including one or more pollutants. The method also includes degrading the pollutants on the nanocomposite and a method of fabrication of the nanocomposite.

20 Claims, 5 Drawing Sheets

---

50

Mix a calcium silicate ($CaSiO_3$), a graphite-phase carbon nitride ($g-C_3N_4$), and a copper salt in a glycol solvent to form a mixture — 52

Microwave the mixture to form the $Cu_2(OH)_3NO_3/CaSiO_3@g-C_3N_4$ nanocomposite — 54

COPPER HYDROXY NITRATE/CALCIUM SILICATE @GRAPHITE-PHASE CARBON NITRIDE ($Cu_2(OH)_3NO_3/CaSiO_3$@$G-C_3N_4$) BASED PHOTOCATALYST FOR WASTEWATER TREATMENT

BACKGROUND

Technical Field

The present disclosure is directed towards photocatalytic degradation, and, more particularly, towards a photocatalytic degradation of pollutants in wastewater using a copper hydroxide nitrate ($Cu_2(OH)_3NO_3$) and calcium silicate ($CaSiO_3$) based nanocomposite dispersed on a matrix of graphite-phase carbon nitride ($g-C_3N_4$).

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Both organic and inorganic contaminants have the potential to have catastrophic consequences and seriously damage environmental systems. Heavy metal ions plagued the globe are toxic, carcinogenic, and non-biodegradable. The manufacturing of chemicals, textiles, leather, plastics, mining, batteries, paint and pigments, paper, and pulp are examples of human-induced activities that contribute to heavy metal pollution. The environment is seriously threatened by the untreated discharge of the hazardous metals into streams and effluents.

Pollutants may enter living things through food chains and have the potential to cause major illnesses such as cancer, harm to the nervous system, and kidney failures. At high concentrations, they may even be lethal. Many common procedures, such as membrane filtration, ion exchange, coagulation, precipitation, reverse osmosis, and adsorption approaches, have been used in the search for a remediation process to remove harmful metal ions. Because of the exceptional exclusion capabilities for ions at trace levels, as well as the affordability and ease of use in comparison to traditional procedures, adsorption methods are highly preferred among the above-mentioned approaches. The most prevalent ionic heavy metals found in industrial water runoff include elements such as cadmium (Cd), chromium (Cr), copper (Cu), iron (Fe), lead (Pb), nickel (Ni), argenteum (Ag), zinc (Zn), and uranium (U), where copper typically are present in wastewater at a significant concentration as copper is the most prized and widely used metal in many engineering applications, such as metal polishing, electroplating, and etching. As a cost-effective metal-free n-type semiconductor that is chemically and thermally stable, visible light responsive, innocuous, and simple to manufacture, graphite-phase carbon nitride ($g-C_3N_4$) has garnered a lot of attention lately [See: Singh, D., et al. (2014) "Citric acid coated magnetic nanoparticles: synthesis, characterization and application in removal of Cd (II) ions from aqueous solution", *Journal of Water Process Engineering*, 4: p. 233-241]. However, the graphite-phase carbon nitride ($g-C_3N_4$) also poses numerous disadvantages such as poor specific surface area, rapid electron-hole pair recombination, and challenging exfoliation. Heteroatom doping and changes to the microstructure design are used to address those issues, where adding metal nanoparticles to $g-C_3N_4$ nanosheets may prevent $g-C_3N_4$ nanosheets from wrapping, maintaining a larger specific surface area and increasing adsorption capacity. For example, magnesium yttrium oxide doped graphitic carbon nitride composite ($MgY_2O_4$-$g-C_3N_4$), oxidized graphitic carbon nitride polyaniline nanofibers composite (Ox-$g-C_3N_4$/Pani-NF), and cobalt ferrite doped graphitic carbon nitride composite ($CoFe_2O_4$-$g-C_3N_4$) were used to exclude copper ions, whereas cadmium sulfide doped graphitic carbon nitride composite (CdS/$gC_3N_4$, $Y_2O_3$@$g-C_3N_4$), and zinc oxide doped graphitic carbon nitride composite (ZnO-$g-C_3N_4$) were used to exclude cadmium ions. Several studies have described that metal oxides doping graphite-phase carbon nitride ($g-C_3N_4$) as an efficient method to improve pore volume and average pore size of the graphite-phase carbon nitride ($g-C_3N_4$). [See: Sharma, D., et al. (2022) "In-situ synthesis of ZnO modified $g-C_3N_4$ composite: a potential photocatalyst and adsorbent for wastewater remediation", *Materials research innovations*, 26 (2): p. 65-75 and Li, D., et al. (2021) "Electrochemical hydrogen evolution reaction efficiently catalyzed by Ru—N coupling in defect-rich Ru/$gC_3N_4$ nanosheets", *Journal of Materials Chemistry A*, 9 (26): p. 15019-15026].

However, incorporating metal particles into $g-C_3N_4$ nanocomposites may introduce several drawbacks. The metal particles may lead to agglomeration, reducing the surface area and catalytic efficiency. While metal particles can improve charge separation, they may also increase the risk of charge recombination if not properly dispersed. The interaction between metal particles and $g-C_3N_4$ may sometimes be unstable, leading to degradation under harsh conditions. Additionally, the synthesis of metal-$g-C_3N_4$ composites may be complex and costly, and the leaching of metals into the environment may pose toxicity risks.

Carbon based nanoparticles have several benefits. Their highly specialized surface area improves the active area required for different applications and permits greater contact with the electrolyte. Additionally, carbon nanoparticles are generally electrically conductive, which is essential for effective charge and discharge procedures [See: Ibrahim, T. G., et al. (2024) "Eliminating Manifold Pharmaceutical Pollutants with Carbon Nanoparticles Driven via a Short-Duration Ball-Milling Process", *Surfaces*, 7 (3): p. 493-507]. The performance of carbon nanomaterials may be improved by rapidly loading them with more electrochemically active species. They are also chemically stable. In addition, they are economically suitable and ecologically sustainable. Additionally, the energy density and rate performance of the supercapacitor may be enhanced by including carbon nanomaterials into composites or by combining them with other materials like metal sheets or graphene [See: Khairy, M., et al. (2024) "Enhancing the Conductivity and Dielectric Characteristics of Bismuth Oxyiodide via Activated Carbon Doping", *Molecules*. 29 (9): p. 2082]. Because of the special qualities and adaptability, carbon nanomaterials present a viable option for high-performance supercapacitors. For supercapacitors, $g-C_3N_4$ has several benefits over activated carbon. First, activated carbon has a tendency to become inactive under visible light, while $g-C_3N_4$ itself is an active photocatalyst, which means that $g-C_3N_4$ can use solar energy to store charge, making it a sustainable and renewable energy source. Furthermore, $g-C_3N_4$ may absorb a wider spectrum of light wavelengths than activated carbon due to its lower bandgap, which enhances supercapacitor performance and energy conversion efficiency. Additionally, by using carbon-defect and two-dimensional engineering, $g-C_3N_4$ may be readily altered and customized to improve its structural characteristics and decrease thickness. These modifications increase surface area and porosity, which are beneficial for charge storage in supercapacitors. Overall, $g-C_3N_4$ offers superior photoactivity, a more comprehensive light absorption range, and enhanced structural properties than activated carbon, making it a promising material for photocatalysis applications.

However, using carbon-based materials in $g-C_3N_4$ nanocomposites may have some drawbacks. The introduction of carbon may enhance conductivity and improve photocatalytic performance, but it may also lead to the formation of defects or reduced stability in certain environments. The dispersion of carbon materials may be challenging, leading to poor uniformity and decreased effectiveness. Additionally, carbon-based composites may face issues with charge recombination if not properly engineered. Long-term stability and potential environmental concerns, such as the leaching of carbon components, may also limit the practical applications.

Each of the aforementioned materials suffers from one or more drawbacks hindering their adoption. Accordingly, one object of the present disclosure is to provide a nanocomposite material for photocatalytic degradation of organic pollutants that may circumvent the drawbacks, such as high energy consumption, high investment, and high-cost factors, of the materials known in the art.

SUMMARY

One aspect of the present disclosure is a method of photocatalytic degradation. The method may include contacting a copper hydroxide nitrate/calcium silicate/graphite-phase carbon nitride ($Cu_2(OH)_3NO_3/CaSiO_3$@$g-C_3N_4$) nanocomposite with a solution including one or more pollutants. Further, the method may include degrading the pollutants on the $Cu_2(OH)_3NO_3/CaSiO_3$@$g-C_3N_4$ nanocomposite.

In a further embodiment, the $Cu_2(OH)_3NO_3/CaSiO_3$@$g-C_3N_4$ nanocomposite may include a graphite-phase carbon nitride ($g-C_3N_4$), a copper hydroxide nitrate ($Cu_2(OH)_3NO_3$) and a calcium silicate ($CaSiO_3$).

In a further embodiment, the pollutants may be an organic pollutant.

In a further embodiment, $Cu_2(OH)_3NO_3/CaSiO_3$@$g-C_3N_4$ nanocomposite may have a bandgap energy of 2.6 electron volt (eV) to 2.8 eV.

In a further embodiment, an absorption rate of the one or more pollutants onto the $Cu_2(OH)_3NO_3/CaSiO_3$@$g-C_3N_4$ nanocomposite may follow a pseudo-first order kinetic model.

In a further embodiment, a process of making a $Cu_2(OH)_3NO_3/CaSiO_3$@$g-C_3N_4$ nanocomposite is described. The process may include mixing $CaSiO_3$, $g-C_3N_4$, and a copper salt in a glycol solvent to form a mixture. Further, the process may include microwaving the mixture to form the $Cu_2(OH)_3NO_3/CaSiO_3$@$g-C_3N_4$ nanocomposite.

In a further embodiment, the process may include forming the $CaSiO_3$ by sonicating a mixture of a calcium salt and a silicate salt in an aqueous alcohol solution to form a calcium silicate mixture, followed by heating the calcium silicate mixture to form the $CaSiO_3$.

In a further embodiment, the calcium salt may be selected from a group including calcium nitrate, calcium chloride, calcium phosphate, calcium carbonate, and calcium citrate, and the silicate salt may be selected from a group including calcium silicate, sodium silicate, potassium silicate, zeolites, and micas.

In a further embodiment, the method further may include forming the $g-C_3N_4$ by heating urea.

In a further embodiment, the copper salt may be selected from a group including copper nitrate, copper chloride, copper sulfate, copper bromide, and copper cyanide.

In a further embodiment, the method of microwaving may be performed at an elevated temperature under certain pressure.

In a further embodiment, the $Cu_2(OH)_3NO_3/CaSiO_3$@$g-C_3N_4$ nanocomposite may include a plurality of metal oxide nanorods and a plurality of $g-C_3N_4$ nanosheets.

In a further embodiment, the $Cu_2(OH)_3NO_3/CaSiO_3$@$g-C_3N_4$ nanocomposite may have the metal oxide nanorods comprising $Cu_2(OH)_3NO_3$ and $CaSiO_3$.

In a further embodiment, the $Cu_2(OH)_3NO_3/CaSiO_3$@$g-C_3N_4$ nanocomposite may have the metal oxide nanorods of a certain average length.

In a further embodiment, the $Cu_2(OH)_3NO_3/CaSiO_3$@$g-C_3N_4$ nanocomposite may have the metal oxide nanorods including nanowires protruding perpendicularly to the rods.

In a further embodiment, the $Cu_2(OH)_3NO_3/CaSiO_3$@$g-C_3N_4$ nanocomposite has the metal oxide nanorods with nanowires dispersed on the $g-C_3N_4$ nanosheets.

In a further embodiment, the $Cu_2(OH)_3NO_3/CaSiO_3$@$g-C_3N_4$ nanocomposite may have some aggregates of the metal oxide nanorods dispersed on the $g-C_3N_4$ nanosheets.

In a further embodiment, the $Cu_2(OH)_3NO_3/CaSiO_3$@$g-C_3N_4$ nanocomposite may have a mesoporous structure with a plurality of wide pores in the $g-C_3N_4$ nanosheets where the metal oxide nanorods deposit.

In a further embodiment, the $Cu_2(OH)_3NO_3/CaSiO_3$@$g-C_3N_4$ nanocomposite may have a certain average pore diameter.

In a further embodiment, the $Cu_2(OH)_3NO_3/CaSiO_3$@$g-C_3N_4$ nanocomposite may exhibit certain Brunauer-Emmett-Teller (BET) surface area.

In a further embodiment, the $Cu_2(OH)_3NO_3/CaSiO_3$@$g-C_3N_4$ nanocomposite may have a certain average pore volume.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof may be readily obtained as the same becomes better understood by reference to the following detailed description when considered in connection with the accompanying drawings, wherein.

DETAILED DESCRIPTION

Figure 1:
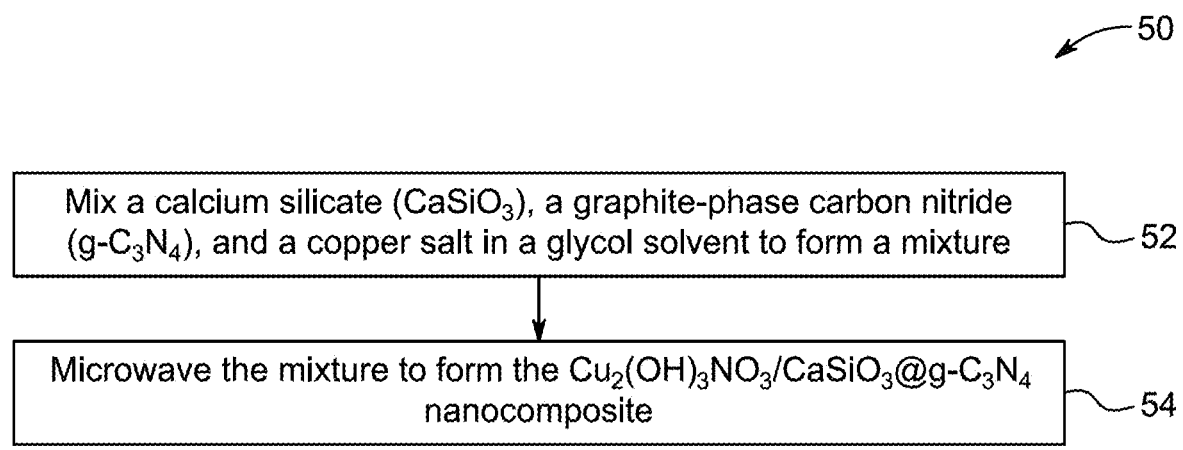
FIG. 1 is a schematic flowchart of a method of fabricating the copper hydroxide nitrate/calcium silicate/graphite-phase carbon nitride ($Cu_2(OH)_3NO_3/CaSiO_3$@$g-C_3N_4$) nanostructure, according to certain embodiments.

When describing the present disclosure, the terms used are to be construed in accordance with the following definitions, unless a context dictates otherwise.

Embodiments of the present invention may now be described more fully hereinafter with reference to the accompanying drawings wherever applicable, in that some, but not all, embodiments of the disclosure are shown.

In the drawings, reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing the adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'organic pollutant' refers to a type of pollutant that contains carbon-based compounds, generally originating from human activities. These pollutants may come from sources like pesticides, industrial chemicals, plastics, and solvents. They tend to be harmful to the environment and living organisms, as they may be toxic, persistent, and bioaccumulate in ecosystems. Examples include substances such as benzene, dichlorodiphenyl-trichloroethane (DDT), and polychlorinated biphenyls (PCBs).

The organic contaminant may be a dye, a phenol, a polycyclic aromatic hydrocarbon, a herbicide, a pesticide, a persistent organic pollutant, or so on.

A dye is a colored substance that chemically binds to a material it may be intended to color. Generally, the dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurprin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

A herbicide (also known as 'weedkiller') is a substance that is toxic to plants and may kill, inhibit the growth of, or prevent the germination of plants. Herbicide is typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as a herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, may be transported by wind and water, and may persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

Another aspect of the present disclosure is a $Cu_2(OH)_3NO_3/CaSiO_3@g\text{-}C_3N_4$ nanocomposite designed to function as a photocatalyst for wastewater treatment. The photocatalyst offers superior photoactivity, a more comprehensive light absorption range, and enhanced structural properties than activated carbon, making it a promising material for photocatalysis applications. The present disclosure circumvents the drawbacks of prior art by addressing key limitations such as high energy consumption, high investment, high-cost factor, and environmental concerns of the materials known in the art. Traditional activated carbon often suffers from low stability, poor conductivity, and limited electrochemical performance, reducing the overall efficiency. In contrast, the present disclosure uses a cost-effective catalyst that has better photoactivity, a wider spectrum of visible light absorption with a wavelength range of 200 to 800 nm, preferably 200 to 600 nm, and improved structural qualities than activated carbon. The simplicity of its preparation and its high catalytic activity also ensure scalability and practical applicability, thereby making it a suitable photocatalyst for organic pollutant removal.

A $Cu_2(OH)_3NO_3/CaSiO_3@g\text{-}C_3N_4$ nanocomposite catalyst (also referred to as a nanocomposite) is described. The nanocomposite includes copper hydroxide nitrate ($Cu_2(OH)_3NO_3$) and calcium silicate ($CaSiO_3$) based nanocomposite dispersed on a matrix of graphite-phase carbon nitride (g-$C_3N_4$). In some embodiments, the graphite-phase carbon nitride (g-$C_3N_4$) is present in an amount of 5 to 10 percent by weight (wt. %), preferably 10 to 15 wt. %, more preferably 15 to 20 percent wt. % based on the total weight of the nanocomposite. In a preferred embodiment, a graphite-phase carbon nitride (g-$C_3N_4$) is present in an amount of 20 to 40 wt. %. based on the total weight of the nanocomposite.

In some embodiments, the copper hydroxide nitrate ($Cu_2(OH)_3NO_3$) is present in an amount of 5 to 10 percent by weight (wt. %), preferably 10 to 15 wt. %, more preferably 15 to 20 percent wt. % based on the total weight of the nanocomposite. In a preferred embodiment, the copper hydroxide nitrate ($Cu_2(OH)_3NO_3$) is present in an amount of 20 to 40 wt. %. based on the total weight of the nanocomposite.

In some embodiments, the calcium silicate ($CaSiO_3$) is present in an amount of 5 to 10 percent by weight (wt. %), preferably 10 to 15 wt. %, more preferably 15 to 20 percent wt. % based on the total weight of the nanocomposite. In a preferred embodiment, a graphite-phase carbon nitride (g-$C_3N_4$) is present in an amount of 20 to 40 wt. %. based on the total weight of the nanocomposite.

In some embodiments, the $Cu_2(OH)_3NO_3$/$CaSiO_3$@g-$C_3N_4$ nanocomposite has a bandgap energy of 1.1 to 1.5 electron volt (eV), preferably 1.3 to 1.6 eV, more preferably 1.4 to 1.8 eV, and more preferably 1.6 to 1.9 eV. In a preferred embodiment, the $Cu_2(OH)_3NO_3$/$CaSiO_3$@g-$C_3N_4$ nanocomposite has a bandgap energy of 2.6 to 2.8 eV. A bandgap energy of 2.6 to 2.8 eV means that the $Cu_2(OH)_3NO_3$/$CaSiO_3$@g-$C_3N_4$ nanocomposite may absorb visible light within that energy range, making it suitable for photocatalytic applications such as pollutant degradation or solar energy conversion. This bandgap allows it to be activated under sunlight, enhancing its efficiency in environmental or energy-related processes.

In some embodiments, the nanocomposite is porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), imaging techniques such as scanning electron microscopy (SEM) and transmission electron microscopy (TEM). In a preferred embodiment, the Cuz$(OH)_3NO_3$/$CaSiO_3$@g-$C_3N_4$ nanocomposite has a mesoporous structure with a plurality of wide pores in the g-$C_3N_4$ nanosheets where the metal oxide nanorods deposit.

A Brunauer-Emmett-Teller (BET) specific surface area of the nanocomposite is in a range of from 10-40 square meters per gram ($m^2/g$), preferably 40-60 $m^2/g$, preferably 45-65 $m^2/g$, preferably 60-80 $m^2/g$, preferably 65-85 $m^2/g$, preferably 85-105 $m^2/g$, preferably 115-125 $m^2/g$, preferably 125-145 $m^2/g$, and preferably 135-165 $m^2/g$. In a preferred embodiment, the $Cu_2(OH)_3NO_3$/$CaSiO_3$@g-$C_3N_4$ nanocomposite has a Brunauer-Emmett-Teller (BET) surface area of 140 to 160 $m^2 \cdot g^{-1}$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. The marked high specific surface area reflects the good dispersion of the metal oxide nanoparticles on g-$C_3N_4$. and $CaSiO_3$. In some embodiments, pore diameter, pore volume, and BET surface area are measured by gas adsorption analysis, preferably $N_2$ adsorption analysis (e.g., $N_2$ adsorption isotherms).

An average pore volume of the nanocomposite, according to the Barrett-Joyner-Halenda (BJH) measurement method, is in a range of from 0.06 to 0.12 cubic centimeter per gram ($cm^3/g$), preferably 0.07 to 0.11 $cm^3/g$, preferably 0.08 to 0.10 $cm^3/g$, and preferably 0.09 $cm^3/g$. In a preferred embodiment, the $Cu_2(OH)_3NO_3$/$CaSiO_3$@g-$C_3N_4$ nanocomposite has an average pore volume of 0.3 to 0.4 $cm^3 \cdot g^{-1}$.

An average pore diameter of the nanocomposite, according to the BJH measurement method, is in a range of 10 to 15 nm, preferably 9 to 14 nm, preferably 8 to 12 nm, and more preferably 7 to 10 nm. In a preferred embodiment, according to the BJH measurement method, $Cu_2(OH)_3NO_3$/$CaSiO_3$@g-$C_3N_4$ nanocomposite material has an average pore diameter of from about 3 to 7 nm.

In a preferred embodiment, the $Cu_2(OH)_3NO_3$/$CaSiO_3$@g-$C_3N_4$ nanocomposite includes a plurality of metal oxide nanorods and a plurality of g-$C_3N_4$ nanosheets. In another preferred embodiment, the $Cu_2(OH)_3NO_3$/$CaSiO_3$@g-$C_3N_4$ nanocomposite has the metal oxide nanorods, including $Cu_2(OH)_3NO_3$ and $CaSiO_3$.

In some embodiments, metal oxides in the nanocomposite may exist as nanoparticles, nanospheres, nanowires, nanoflakes, or thin films, depending on the synthesis conditions. These different morphologies can influence the surface area, reactivity, and interaction with g-$C_3N_4$, ultimately affecting the photocatalytic or adsorption performance of the composite.

In some embodiments, the $Cu_2(OH)_3NO_3$/$CaSiO_3$@g-$C_3N_4$ nanocomposite has the metal oxide nanorods of an average length of 0.5 to 0.8 micrometers (μm), preferably 0.8 to 1 μm, and more preferably 1 to 2 μm. In a preferred embodiment, the $Cu_2(OH)_3NO_3$/$CaSiO_3$@g-$C_3N_4$ nanocomposite has the metal oxide nanorods of an average length of 1 to 3 μm.

In a preferred embodiment, the $Cu_2(OH)_3NO_3$/$CaSiO_3$@g-$C_3N_4$ nanocomposite has the metal oxide nanorods, including nanowires protruding perpendicularly to the rods. Apart from nanowires protruding perpendicularly, the metal oxide nanorods in the $Cu_2(OH)_3NO_3$/$CaSiO_3$@g-$C_3N_4$ nanocomposite may exhibit alternative arrangements such as nanowires aligned parallel to the rod axis, angled or tilted at various degrees, randomly oriented in multiple directions, helically wrapped around the rods, or forming branched/dendritic structures. These variations influence the surface area, light interaction, and catalytic properties of the nanocomposite.

In some embodiments, the $Cu_2(OH)_3NO_3$/$CaSiO_3$@g-$C_3N_4$ nanocomposite has the metal oxide nanorods, including nanowires of a length 1 to 3 nm, dispersed on the g-$C_3N_4$ nanosheets, preferably length 4 to 8 nm, and more preferably 4 to 10 nm. In a preferred embodiment, the $Cu_2(OH)_3NO_3$/$CaSiO_3$@g-$C_3N_4$ nanocomposite has the metal oxide nanorods, including nanowires of a length of 10 to 50 nm, dispersed on the g-$C_3N_4$ nanosheets.

In a preferred embodiment, the $Cu_2(OH)_3NO_3$/$CaSiO_3$@g-$C_3N_4$ nanocomposite has some aggregates of the metal oxide nanorods dispersed on the g-$C_3N_4$ nanosheet. The metal oxide nanorods in the $Cu_2(OH)$: $NO_3$/$CaSiO_3$@g-$C_3N_4$ nanocomposite may exhibit various arrangements on the g-$C_3N_4$ nanosheets. These include uniformly dispersed individual rods, clustered aggregates, oriented arrays aligned in a specific direction, randomly oriented rods, interwoven or cross-linked networks, or vertically aligned rods standing on the nanosheet surface. Each configuration may influence charge transfer efficiency and active surface exposure.

According to another aspect of the present disclosure, a method of making the $Cu_2(OH)_3NO_3$/$CaSiO_3$@g-$C_3N_4$ nanocomposite material is described (FIG. 1). The order in which the method 50 is described is not intended to be construed as a limitation, and any number of the method steps described may be combined to implement the method 50. Additionally, individual steps may be removed or skipped from method 50 without departing from the spirit and scope of the present disclosure.

At step 52, the method 50 includes mixing a calcium silicate ($CaSiO_3$), a graphite-phase carbon nitride (g-$C_3N_4$), and a copper salt in a glycol solvent to form a mixture. The mixture refers to a homogeneous suspension or dispersion containing calcium silicate ($CaSiO_3$), graphite-phase carbon nitride (g-$C_3N_4$), and a copper salt uniformly combined in a glycol solvent, serving as the precursor for nanocomposite formation.

In some embodiments, the calcium silicate is formed by sonicating a mixture of a calcium salt and a silicate salt in an aqueous alcohol solution to form a calcium silicate mixture, and heating the calcium silicate mixture to a temperature of 160 to 200° C. for 1 to 3 hours (h) to form the $CaSiO_3$.

In some embodiments, the calcium salt is selected from calcium nitrate, calcium chloride, calcium phosphate, calcium carbonate, and calcium citrate. In a preferred embodiment, the calcium salt is calcium nitrate. In some embodiments, the silicate salt is at least one selected from potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In some embodiments, the silicate salt is selected from the group consisting of calcium silicate, sodium silicate, potassium silicate, zeolites, and micas. In a preferred embodiment, the silicate salt is sodium metasilicate.

In some embodiments, the aqueous alcohol solution may include at least one alcohol selected from methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, equal moles of calcium nitrate and sodium metasilicate were dispersed in 100 ml of ethanol: water (1:1). Water may be tap water, distilled water, double-distilled water, deionized water, deionized distilled water, reverse osmosis water, and/or some other water.

In some embodiments, the calcium silicate mixture can be heated using heating appliances such as ovens, microwaves, autoclaves, hot plates, heating mantles and tapes, oil baths, salt baths, sand baths, air baths, hot-tube furnaces, and hot-air guns.

In some embodiments, the calcium silicate mixture is heated at a temperature of from 160-200° C., preferably 161-198° C., preferably 162-197° C., preferably 163-196° C., preferably 164-195° C., preferably 165-194° C., preferably 166-193° C., preferably 167-192° C., preferably 168-191° C., preferably 169-190° C., preferably 170-189° C., preferably 171-187° C., preferably 172-188° C., preferably 173-187° C., preferably 174-186° C., preferably 175-185° C., preferably 176-184° C., preferably 177-183° C., preferably 178-182° C., preferably 179-181° C., for 1-3 h, preferably 1.1-2.9 h, preferably 1.2-2.8 h, preferably 1.3-2.7 h, preferably 1.4-2.6 h, preferably 1.5-2.5 h, preferably 1.6-2.4 h, preferably 1.7-2.3 h, preferably 1.8-2.2 h, preferably 1.9-2.1 h to form the $CaSiO_3$. In a preferred embodiment, the mixture is transferred in an autoclave and heated at 180° C. for 2 h in an oven.

In some embodiments, the g-$C_3N_4$ is formed by heating urea to a temperature of 550 to 650° C., preferably 555-645° C., preferably 560-640° C., preferably 565-635° C., preferably 570-630° C., preferably 575-625° C., preferably 580-620° C., preferably 585-615° C., preferably 590-610° C., preferably 595-605° C. for 30-60 min, preferably 31-59 min, preferably 32-58 min, preferably 33-57 min, preferably 34-56 min, preferably 35-55 min, preferably 36-54 min, preferably 37-53 min, preferably 38-52 min, preferably 39-51 min, preferably 40-50 min, preferably 41-49 min, preferably 42-48 min, preferably 43-47 min, preferably 44-46 min. In a preferred embodiment, the urea is heated at 600° C. for 45 min.

In a further embodiment, other nitrogen-containing precursors, to urea, such as melamine, dicyandiamide, ammonium thiocyanate, or ammonium carbonate, may also be used. These alternatives provide nitrogen necessary for the formation of carbon nitride structures. Typically, these precursors are used in amounts of approximately 5 wt. % relative to the total weight of the nanocomposite to achieve the desired nitrogen content for the desired structural properties.

In some embodiments, the copper salt is selected from the group consisting of copper nitrate, copper chloride, copper sulfate, copper bromide, and copper cyanide.

In some embodiments, the $Cu_2(OH)_3NO_3$/$CaSiO_3$@g-$C_3N_4$ nanostructure includes $Cu_2(OH)_3NO_3$, $CaSiO_3$, and g-$C_3N_4$ in a mass ratio of 0.5-1.5:0.5-1.5:0.5-1.5, preferably 0.6-1.4:0.6-1.4:0.6-1.4, preferably 0.7-1.3:0.7-1.3:0.7-1.3, and preferably 0.8-1.2:0.8-1.2:0.8-1.2, preferably 0.9-1.1: 0.9-1.1:0.9-1.1 in a preferred embodiment, the mass ratio of $Cu_2(OH)_3NO_3$, $C_3N_4$ $CaSiO_3$, and g- is 1:1:1.

At step 54, the method 50 includes microwaving the mixture to form the $Cu_2(OH)_3NO_3$/$CaSiO_3$@g-$C_3N_4$ nanostructure. In some embodiments, the mixture is microwaved at a temperature of 160-200° C., preferably 161-199° C., preferably 163-197° C., preferably 165-195° C., preferably 167-193° C., preferably 169-191° C., preferably 171-189° C., preferably 173-187° C., preferably 175-185° C., preferably 177-183° C., preferably 178-182° C., preferably 179-181° C., at a pressure of 4 to 6 bar, preferably 4.1-5.9 bar, preferably 4.2-5.8 bar, preferably 4.3-5.7 bar, preferably 4.4-5.6 bar, preferably 4.5-5.5 bar, preferably 4.6-5.4 bar, preferably 4.7-5.3 bar, preferably 4.8-5.2 bar, preferably 4.9-5.1 bar, for 30-90 min, preferably 31-89 min, preferably 33-87 min, preferably 36-85 min, preferably 39-83 min, preferably 41-81 min, preferably 43-79 min, preferably 46-77 min, preferably 49-75 min, preferably 52-73 min, preferably 55-70 min, preferably 57-68 min, preferably 59-65 min. In a preferred embodiment, the mixture is microwaved at 180° C. and 5.0 bar pressure for 60 min to form the nanocomposite.

A method of photocatalytic degradation of organic pollutants using the nanocomposite is also described. The method includes contacting the $Cu_2(OH)_3NO_3$/$CaSiO_3$@g-$C_3N_4$ nanocomposite with a solution including one or more pollutants, and further degrading the one or more pollutants on the $Cu_2(OH)_3NO_3$/$CaSiO_3$@g-$C_3N_4$ nanocomposite.

In some embodiments, the pollutants include organic pollutants like dye, a phenol, polycyclic aromatic hydrocarbons, an herbicide, a pesticide, a persistent organic pollutant, or so on. In a preferred embodiment, the contaminants include organic contaminants selected from the group consisting of a polyaromatic hydrocarbon, a halogenated polyaromatic hydrocarbon; a phenol, a halogenated phenol; a furan, a halogenated furan; a dioxine, a halogenated dioxine; a biphenyl, a halogenated phenyl, and an organic dye.

In a preferred embodiment, the absorption rate of the one or more pollutants onto the $Cu_2(OH)_3NO_3$/$CaSiO_3$@g-$C_3N_4$ nanocomposite follows a pseudo-first order kinetic model. A pseudo-first order kinetic model means that the rate of pollutant absorption onto the $Cu_2(OH)_3NO_3$/$CaSiO_3$@g-

$C_3N_4$ nanocomposite depends linearly on the concentration of the pollutant, assuming the concentration of other reactants or sites remains constant. This suggests a surface-driven, single-site dominant adsorption process, often typical for low-concentration pollutant removal.

EXAMPLES

The following examples demonstrate a copper hydroxide nitrate/calcium silicate/graphite-phase carbon nitride [$Cu_2(OH)_3NO_3/CaSiO_3$@g-$C_3N_4$] nanocomposite catalyst as described herein. The examples are provided solely for illustration and are not to be construed as limitations of the present disclosure, as many variations thereof are possible without departing from the spirit and scope of the present disclosure.

Example 1: Fabricating the Calcium Silicate ($CaSiO_3$)

Equal moles of calcium nitrate and sodium metasilicate were dispersed in 100 ml of ethanol: water (1:1) in a 150 ml glass beaker and sonicated for 15 minutes. The mixture was transferred to a 200 ml autoclave and then placed in an oven operated at 180 degree Celsius (° C.) for 2.0 h. The product was dispersed in 500 ml distilled water with an ultrasonic bath for 10 minutes, filtered via a Buchner system, rinsed with distilled water, and dried at 120° C. for 1.0 h.

Example 2: Fabricating the Graphite-Phase Carbon Nitride (g-$C_3N_4$)

About 30.0 g of urea was placed in a 250 ml porcelain crucible, covered with its porcelain cover, then the hall crucible and cover were wrapped with three layers of aluminum foil to reduce the loss of urea evaporation. The crucible was heated via a furnace set at 600° C. for 45 minutes.

Example 3: Fabricating the Copper Hydroxide Nitrate/Calcium Silicate/Graphite-Phase Carbon Nitride ($Cu_2(OH)_2NO_3/CaSiO_3$/g-$C_3N_4$)

2.0 g of $CaSiO_3$, 2.0 g of g-$C_3N_4$, and the amount of $Cu(NO_3)_2 \cdot 3H_2O$ enough to produce 2.0 g of $Cu_2(OH)_2NO_3$ were transferred to a mono wave-200 vial (G30), dispersed in 20 ml ethylene glycol monomethyl ether via an ultrasonic bath for 30 minutes. The vial was closed with its Teflon cover and placed in the Anton-Baer Monowave-200 operated at 180° C. and 5.0 bar pressure for one hour. The product was dispersed in 1 L of distilled water with an ultrasonic bath for 30 minutes, filtered via a Buchner system, rinsed with distilled water, and dried at 150° C. for 2.0 h.

Figure 2:
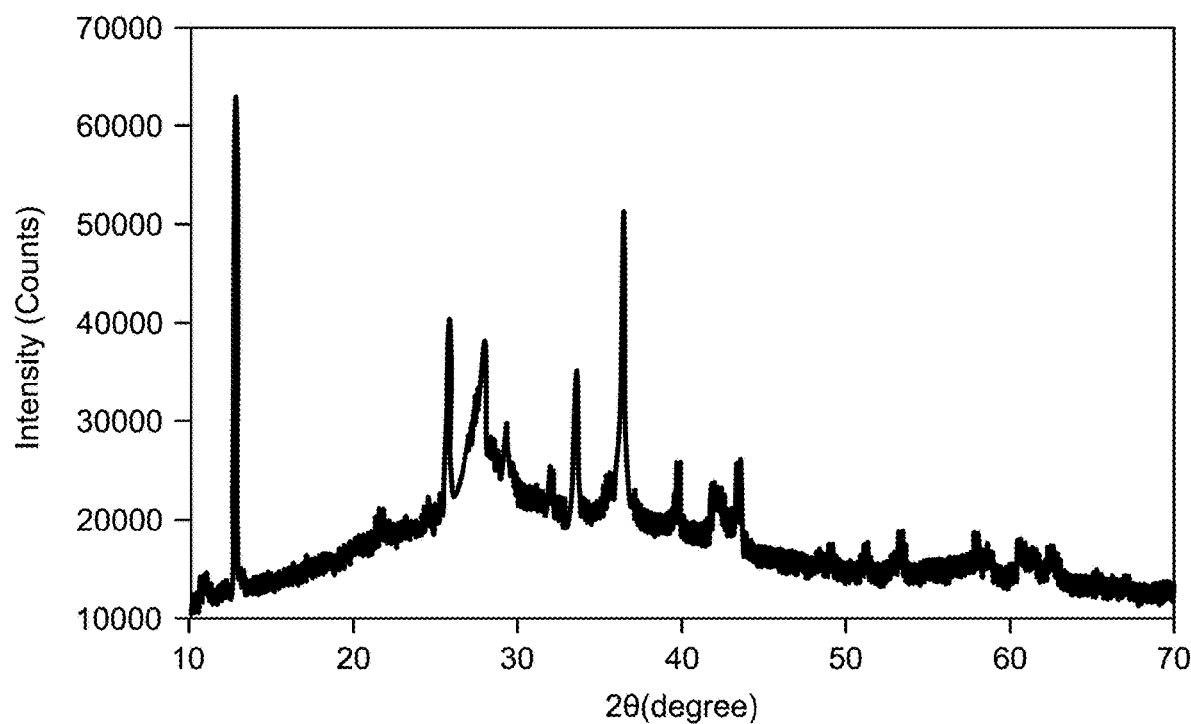
FIG. 2 depicts an X-ray diffraction (XRD) diffractogram of the $Cu_2(OH)_3NO_3/CaSiO_3$@$g-C_3N_4$ nanocomposite, according to certain embodiments.

The crystallinity and phases identification present in $Cu_2(OH)_2NO_3/CaSiO_3$@g-$C_3N_4$ nanocomposite was analyzed by XRD, and the results are given in FIG. 2. The intense peaks and high intensity values indicate that the powder is highly crystalline. In addition, the peak broadening indicates the small particle size of the prepared composites. Examination of the diffraction patterns with the standard JCPDS cards reveals the presence of metallic nanosheets of $Cu_2(OH)_2NO_3$ as a major phase, together with minor phases of $Cu_2O$, $CaSiO_3$, and g-$C_3N_4$. The $Cu_2(OH)_2NO_3$ phase was indexed to the strong reflections at 2θ values of 12.9°, 25.7°, 33.8°, 36.7°, and 43.4° (JCPDS No. 00-003-0061). The $CaSiO_3$ monoclinic phase (JCPDS No. 00-001-0720) was detected at 2θ values of 27.3°, 32.3°, and 62.6°. The $Cu_2O$ was characterized by a strong reflection at a 2θ value of 36.4° (JCPDS No. 01-078-2076). The diffractions related to g-$C_3N_4$ were observed at 33.2°, and 58.0° (COD No. 1534042 and JCPDS No. 00-050-0848). The weak diffractions of both $CaSiO_3$ and g-$C_3N_4$ may be attributed to the semi-crystalline nature of the phases and the high crystallinity of $Cu_2O$ and $Cu_2(OH)_2NO_3$ phases in the prepared composite. No other phases were detected, indicating the successful fabrication of $Cu_2(OH)_2NO_3/CaSiO_3$@g-$C_3N_4$.

Figure 3A:
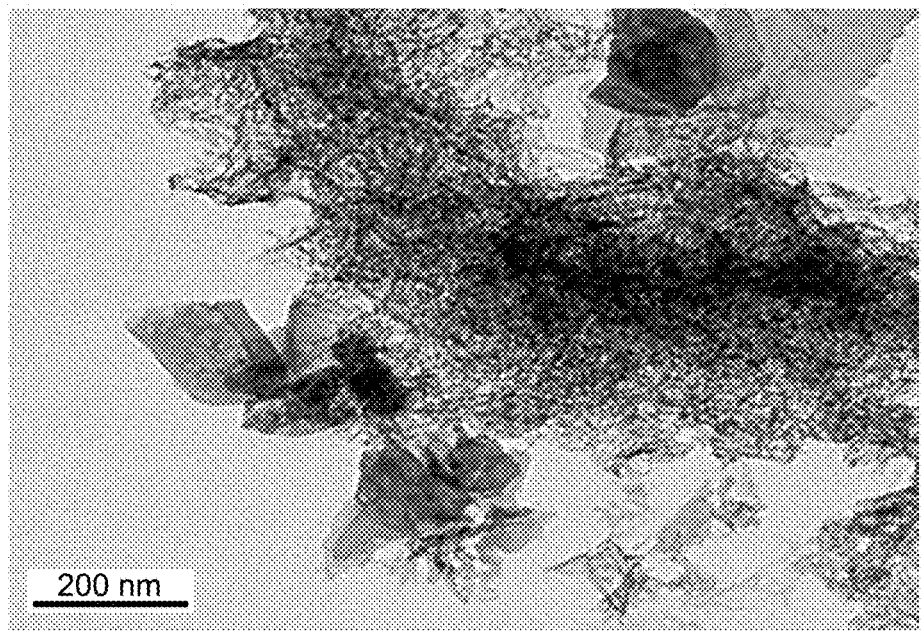
FIG. 3A depicts a transmission electron microscopy (TEM) image of the $Cu_2(OH)_3NO_3/CaSiO_3$@$g-C_3N_4$ nanocomposite at 200 nanometers (nm) magnification, according to certain embodiments.
Figure 3B:
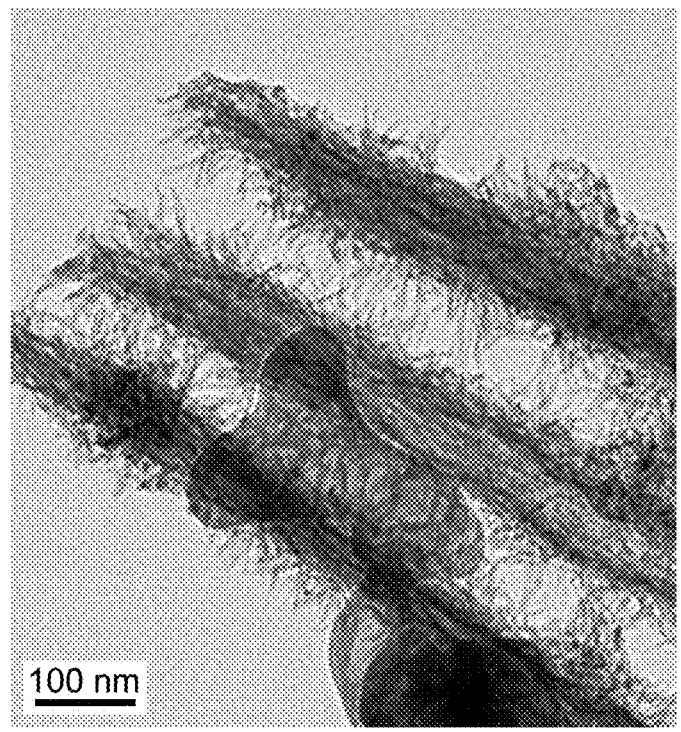
FIG. 3B depicts a TEM image of the $Cu_2(OH)_3NO_3/CaSiO_3$@g-$C_3N_4$ nanocomposite at 100 nm magnification, according to certain embodiments.
Figure 3C:
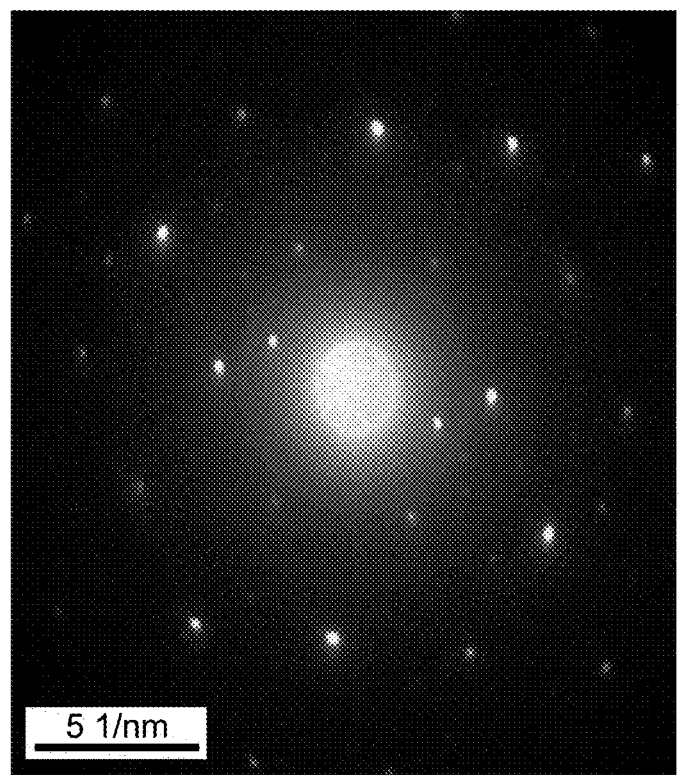
FIG. 3C depicts a selected area electron diffraction (SAED) pattern of the $Cu_2(OH)_3NO_3/CaSiO_3$@g-$C_3N_4$ nanocomposite, according to certain embodiments.

TEM images of $Cu_2(OH)_2NO_3/CaSiO_3$/g-$C_3N_4$ nanocomposite were presented in FIG. 3A-3B. The TEM images showed the two-dimensional porous structure constructed with curled and wrinkled nanosheets and platelets of the g-$C_3N_4$, as shown in FIG. 3A. The image also shows well dispersion of rods metal oxide nanoparticles with a size of 1.97 micrometers (μm) and some aggregates on the nanosheets of g-$C_3N_4$. The corresponding selected area electron diffraction (SAED) pattern reveals diffraction spots with interplanar spacing of 0.365 nm, 0.242 nm, 0.141 nm, and 0.124 nm due to ($CaSiO_3$: 2-12, $Cu_2(NO_3)(OH)_3$:−111), ($CaSiO_3$:−2-12, $Cu_2(NO_3)(OH)_3$:−211), ($CaSiO_3$: 322, $Cu_2(NO_3)(OH)_3$:00-5), and ($CaSiO_3$:−125) diffraction planes, as shown in FIG. 3C.

Figure 4A:
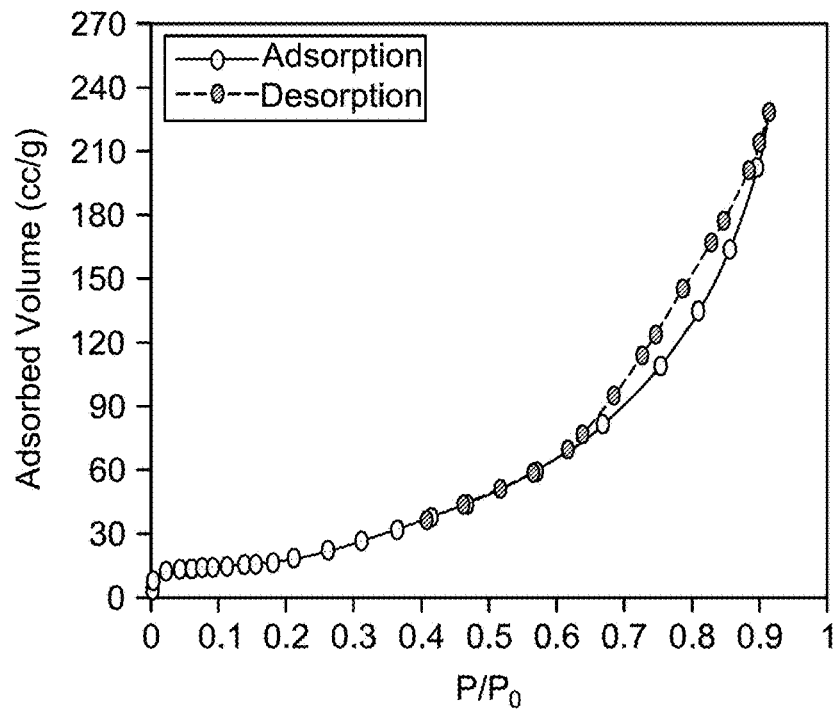
FIG. 4A depicts a nitrogen ($N_2$) adsorption-desorption isotherms of the $Cu_2(OH)_3NO_3/CaSiO_3$@g-$C_3N_4$ nanocomposite, according to certain embodiments.
Figure 4B:
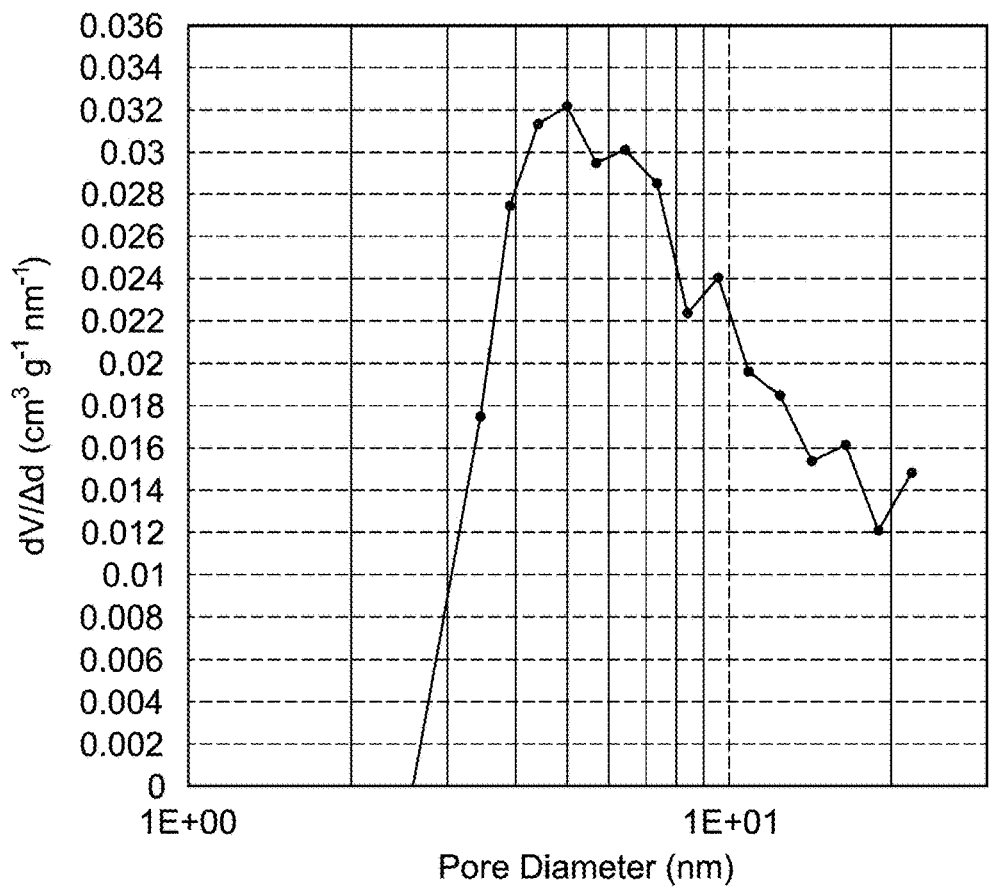
FIG. 4B depicts a corresponding pore size distribution of the $Cu_2(OH)_3NO_3/CaSiO_3$@g-$C_3N_4$ nanocomposite, according to certain embodiments.

FIG. 4 displays the nitrogen adsorption-desorption isotherms of $Cu_2(OH)_2NO_3/CaSiO_3$@g-$C_3N_4$ nanocomposite. The nitrogen sorption isotherm of the composite, belonging to type IV with a noticeable hysteresis loop, indicates the formation of mesoporous structures. However, shifting the loop to a relatively higher pressure (P/P°=0.62-1) suggests the presence of wide mesopores, which may result from the deposition of metal oxide particles in the wide pores of g-$C_3N_4$. Furthermore, the Brunauer-Emmett-Teller (BET) surface area of the $Cu_2(OH)_2NO_3/CaSiO_3$@g-$C_3N_4$ sample was calculated to be 149.9 square meters per gram ($m^2 g^{-1}$). The marked high specific surface area reflects the good dispersion of the metal oxide nanoparticles on g-$C_3N_4$. and $CaSiO_3$. Moreover, the pore size distribution curves, plotted using the Barrett-Joyner-Halenda (BJH) method, for the $Cu_2(OH)_2NO_3/CaSiO_3$@g-$C_3N_4$ sample exhibited unimodal distribution with average pore diameters maximized at 5 nanometers (nm) and pore volume of 0.354 cubic centimeter per gram ($cm^3 g^{-1}$). All the isotherms belong to the category H3 type of pores, which do not exhibit limiting adsorption at high P/P° and arise due to aggregation of plate-like particles, giving rise to slit-shaped pores. This indicates that the assembly of $Cu_2(OH)_2NO_3/CaSiO_3$@g-$C_3N_4$ composite provoked a mesoporous structure.

The utilization of the wide-range visible-light-region in photocatalytic processes requires a low bandgap light source [1.7π electron volt (eV) to 2.92 eV]. as a candidate for visible light absorption and utilization for photocatalytic purposes [See: Li, Y., et al. (2011) "Efficient decomposition of organic compounds and reaction mechanism with BiOI photocatalyst under visible light irradiation", 334 (1-2): p. 116-122, incorporated herein by reference in its entirety]. One of the main goals of using visible-light induced photocatalyst is to displace the harmful ultraviolet light with the safe-visible light. The absorbance of the prepared $Cu_2(OH)_2NO_3/CaSiO_3$@g-$C_3N_4$ was measured in the range of 200 nm to 800 nm.

Notably, when the $Cu_2(OH)_2NO_3/CaSiO_3$ was incorporated with g-$C_3N_4$, the absorption of the composite in the visible area progressively increased. The difference between the band gap energies of $Cu_2(OH)_2NO_3/CaSiO_3$ and bare g-$C_3N_4$ may be the cause of the occurrence. The Tauc plot (Eq. 2) was employed in determining the bandgap-energy ($E_g$) for the synthesized photocatalyst.

$$\alpha h\gamma = A(h\gamma - E_g)^n \qquad (2)$$

Figure 5A:
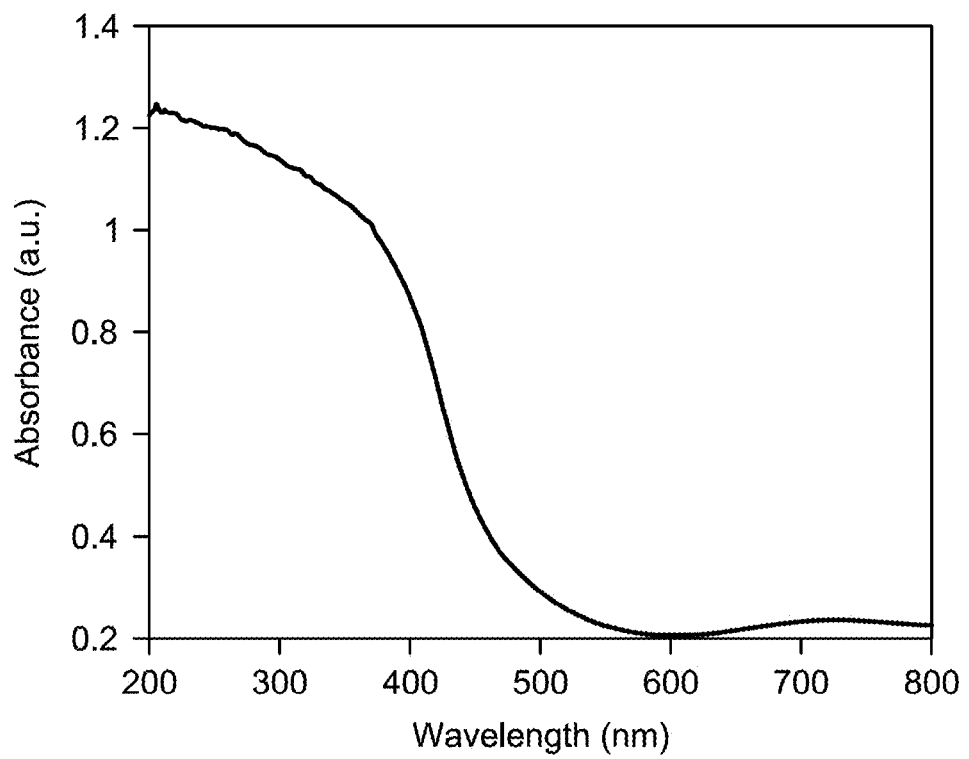
FIG. 5A depicts an Ultraviolet-Visible diffuse reflectance spectra (UV-vis DRS) of the $Cu_2(OH)_3NO_3/CaSiO_3$@g-$C_3N_4$ nanocomposite, according to certain embodiments.
Figure 5B:
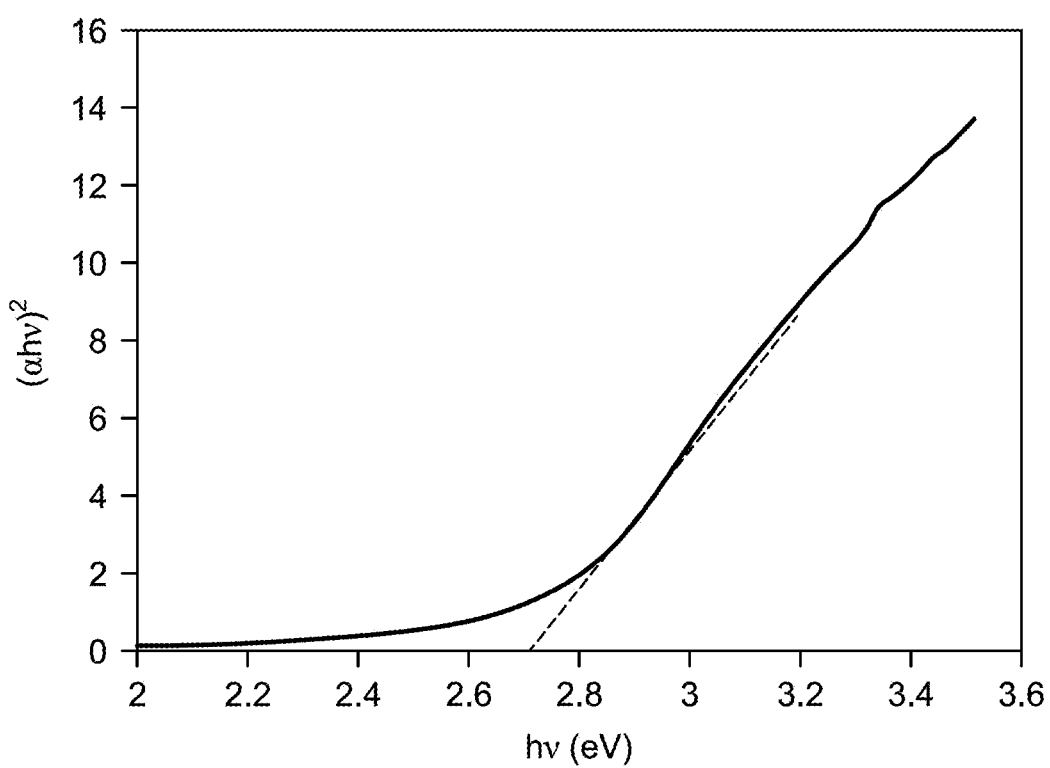
FIG. 5B depicts a corresponding band gap energy of the $Cu_2(OH)_3NO_3/CaSiO_3$@g-$C_3N_4$ nanocomposite, according to certain embodiments.

Where: h represents the Planck constant, α and γ are the absorption coefficient and photonic frequency [See: Cheng, H., et al. (2010) "One-step synthesis of the nanostructured AgI/BiOI composites with highly enhanced visible-light photocatalytic performances", 26 (9): p. 6618-6624, incorporated herein by reference in its entirety]. By calculating the power of n, a value of n=1/2 was revealed to propose a direct permissible transition. As observed in FIG. 5, the $E_g$ was estimated at 2.71 eV, corresponding to the $Cu_2(OH)_2NO_3/CaSiO_3$ composite. The reduced band gap of the $Cu_2(OH)_2NO_3/CaSiO_3$ composite and more response to the visible light were caused by the inserting of metal oxides nanoparticles on g-$C_3N_4$, thus more efficient utilization of solar energy may be achieved, and the improved photocatalytic activity of the $Cu_2(OH)_2NO_3/CaSiO_3$@g-$C_3N_4$ composite may be anticipated. The estimated band gap is typical of the of bismuth oxyiodide (BiOI) known for its high activities in degrading organic compounds under visible light [See: Mehrali-Afjani, M., A. Nezamzadeh-Ejhieh, and H. J. C. P. L. Aghaei (2020) "A brief study on the kinetic aspect of the photodegradation and mineralization of BiOI-$Ag_3PO_4$ towards sodium diclofenac", 759: p. 137873. See: Jeevanantham, N. and O. J. J. o. t. I. C. S. Balasundaram (2019) "High-performance visible light photocatalytic activity of cobalt (Co) doped CdS nanoparticles by wet chemical route", 16 (2): p. 243-251. See: Sabonian, M. and K. J. I. J. o. C. Mahanpoor (2019) "Preparation of ZnO nanocatalyst supported on todorokite and photocatalytic efficiency in the reduction of chromium (VI) pollutant from aqueous solution", 9 (3): p. 201-211. See: Zeng, L., et al. (2019) "Preparation of interstitial carbon doped BiOI for enhanced performance in photocatalytic nitrogen fixation and methyl orange degradation", 539: p. 563-574. All references are incorporated herein by reference in its entirety].

In the present disclosure, a distinct $Cu_2(OH)_2NO_3/CaSiO_3$@g-$C_3N_4$ nanocomposite have been synthesized by simple hydrothermal method for using as efficient photocatalyst. A narrow bandgap (1.77 eV to 2.9 eV) is necessary for the wide-range visible light area to be used in photocatalytic processes as a candidate for visible light absorption and utilization. Several techniques, including visible-UV absorbance, XRD, TEM, and BET, were used to thoroughly analyze the catalyst. To ascertain the degree of its potential application in photocatalysis and pollutant removal, surface texture and optical band gap were both assessed.

Numerous modifications and variations of the present disclosure are possible in light of the above teachings. It is therefore to be understood that within the scope of the appended claims, the invention may be practiced otherwise than as specifically described herein.

The invention claimed is:

1. A method of photocatalytic degradation, comprising:
   contacting a $Cu_2(OH)_3NO_3/CaSiO_3$@g-$C_3N_4$ nanocomposite with a solution comprising one or more pollutants to form a photocatalysis mixture;
   exposing the photocatalysis mixture directly to sunlight; thereby degrading the one or more pollutants on the $Cu_2(OH)_3NO_3/CaSiO_3$@g-$C_3N_4$ nanocomposite.

2. The method of claim 1, wherein the $Cu_2(OH)_3NO_3/CaSiO_3$@g-$C_3N_4$ nanocomposite comprises:
   a graphite-phase carbon nitride (g-$C_3N_4$) in an amount of 20 to 40 percent by weight (wt %), and
   a copper hydroxide nitrate ($Cu_2(OH)_3NO_3$) in an amount of 20 to 40 wt %, and
   a calcium silicate ($CaSiO_3$) in an amount of 20 to 40 wt %,
   based on a total weight of the $Cu_2(OH)_3NO_3/CaSiO_3$@g-$C_3N_4$ nanocomposite catalyst.

3. The method of claim 1, wherein the one or more pollutants is an organic pollutant.

4. The method of claim 1, wherein the $Cu_2(OH)_3NO_3/CaSiO_3$@g-$C_3N_4$ nanocomposite has a bandgap energy of 2.6 to 2.8 eV.

5. The method of claim 1, wherein an absorption rate of the one or more pollutants onto the $Cu_2(OH)_3NO_3/CaSiO_3$@g-$C_3N_4$ nanocomposite follows a pseudo-first order kinetic model.

6. The method of claim 1, wherein the $Cu_2(OH)_3NO_3/CaSiO_3$@g-$C_3N_4$ nanocomposite is made by a process comprising:
   mixing a calcium silicate ($CaSiO_3$), a graphite-phase carbon nitride (g-$C_3N_4$), and a copper salt in a glycol solvent to form a mixture;
   microwaving the mixture to form the $Cu_2(OH)_3NO_3/CaSiO_3$@g-$C_3N_4$ nanocomposite.

7. The method of claim 6, further comprising:
   forming the $CaSiO_3$ by sonicating a mixture of a calcium salt and a silicate salt in an aqueous alcohol solution to form a calcium silicate mixture, followed by
   heating the calcium silicate mixture to a temperature of 160 to 200° C. for 1 to 3 hours to form the $CaSiO_3$,
   wherein the calcium salt is selected from a group consisting of calcium nitrate, calcium chloride, calcium phosphate, calcium carbonate and calcium citrate, and
   wherein the silicate salt is selected from a group consisting of calcium silicate, sodium silicate, potassium silicate, zeolites and micas.

8. The method of claim 6, further comprising:
   forming the g-$C_3N_4$ by heating urea to a temperature of 550 to 650° C. for 30 to 60 minutes.

9. The method of claim 6, wherein the copper salt is selected from a group consisting of copper nitrate, copper chloride, copper sulfate, copper bromide and copper cyanide.

10. The method of claim 6, wherein the microwaving is performed at a temperature of 160 to 200° C. at a pressure of 4 to 6 bar for 30 to 90 minutes.

11. The method of claim 1, wherein the $Cu_2(OH)_3NO_3/CaSiO_3$@g-$C_3N_4$ nanocomposite comprise a plurality of metal oxides nanorods and a plurality of g-$C_3N_4$ nanosheets.

12. The method of claim 1, wherein the $Cu_2(OH)_3NO_3/CaSiO_3$@g-$C_3N_4$ nanocomposite has the metal oxide nanorods comprising $Cu_2(OH)_3NO_3$ and $CaSiO_3$.

13. The method of claim 1, wherein the $Cu_2(OH)_3NO_3/CaSiO_3$@g-$C_3N_4$ nanocomposite has the metal oxide nanorods of an average length 1 to 3 μm.

14. The method of claim 1, wherein the $Cu_2(OH)_3NO_3/CaSiO_3$@g-$C_3N_4$ nanocomposite has the metal oxide nanorods comprising nanowires protruding perpendicularly to the rods.

15. The method of claim 1, wherein the $Cu_2(OH)_3NO_3/CaSiO_3$@g-$C_3N_4$ nanocomposite has the metal oxide nanorods comprising nanowires of a length 10 to 50 nm dispersed on the g-$C_3N_4$ nanosheets.

16. The method of claim 1, wherein the $Cu_2(OH)_3NO_3/CaSiO_3$@g-$C_3N_4$ nanocomposite has some aggregates of the metal oxide nanorods dispersed on the g-$C_3N_4$ nanosheets.

17. The method of claim 1, wherein the $Cu_2(OH)_3NO_3/CaSiO_3$@g-$C_3N_4$ nanocomposite has a mesoporous structure with a plurality of wide pores in the g-$C_3N_4$ nanosheets where the metal oxides nanorods deposit.

18. The method of claim 1, wherein the $Cu_2(OH)_3NO_3/CaSiO_3$@g-$C_3N_4$ nanocomposite has an average pore diameter of 3 to 7 nm.

19. The method of claim 1, wherein the $Cu_2(OH)_3NO_3/CaSiO_3$@g-$C_3N_4$ nanocomposite has a Brunauer-Emmett-Teller (BET) surface area of 140 to 160 $m^2 \cdot g^{-1}$.

20. The method of claim 1, wherein the $Cu_z(OH)_3NO_3/CaSiO_3$@g-$C_3N_4$ nanocomposite has an average pore volume of 0.3 to 0.4 $cm^3 \cdot g^{-1}$.

* * * * *